Nov. 6, 1956 P. C. WETTERAU ET AL 2,769,726
FLEXIBLE HARD SURFACE COVERING AND PROCESS OF PREPARING SAME
Filed Sept. 28, 1953
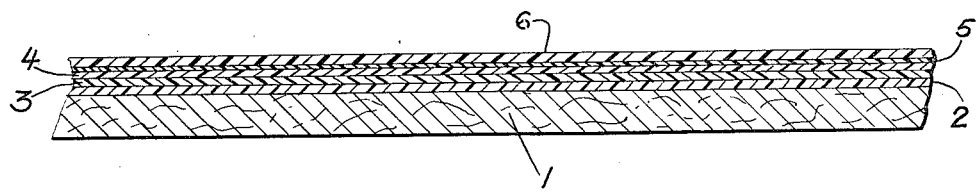
INVENTORS
PAUL C. WETTERAU,
JOHN BISKUP, SPENCER
BY JOHNSON
ATTORNEYS

United States Patent Office 2,769,726
Patented Nov. 6, 1956

2,769,726

FLEXIBLE HARD SURFACE COVERING AND PROCESS OF PREPARING SAME

Paul C. Wetterau, Mountain Lakes, John Biskup, Chatham, and Spencer Johnson, Pompton Plains, N. J., assignors to Congoleum-Nairn Inc., a corporation of New York Application September 28, 1953, Serial No. 382,572

9 Claims. (Cl. 117—76)

This invention relates to flexible hard surface coverings and relates especially to flexible hard surface coverings of the felt base type and having a top coating or layer for providing properties of wear resistance or decoration or both, as may be desired, which adapt the product for use as a covering for floors, walls, panels, articles of furniture and the like.

In the manufacture of coverings of the character above referred to it has been conventional practice to prepare the felt of the base sheet prior to the application thereto of the top coat or layer by impregnating the felt with asphalt and applying to the surface of the asphalt-impregnated felt a seal coat to act as a barrier for preventing the asphalt with which the felt is impregnated from bleeding into and staining the subsequently applied top coat or layer. In coverings of this type the top coat or layer may take different forms and may be applied in different ways. Thus the top coat or layer may consist of print paint of desired different colors applied using a flat bed printing machine, and in such case the pattern of the decoration extends throughout the thickness of the layer. Alternatively, the top layer may be composite in that the pattern of the decoration is first applied to the prepared base sheet using a lightly applied ink or the like which is protected by a subsequently applied clear wear layer film. In such case the decoration or pattern may be applied using one of the rotary graphic art printing processes such as rotogravure, letter press, aniline or lithography.

Coverings of the character aforesaid have been extensively made and sold using oleoresinous and similar vehicles as the base for the coats or layers applied to the felt base sheet. For the top coat or layer oleoresinous print paints have been well known for many years. Likewise in the case of a pattern or decoration that has been applied using rotary graphic art processes the protective clear wear layer or film that is applied thereover commonly has been one wherein the vehicle is a material such as an oleoresinous varnish, an alkyd resin, or a urea-melamine-alkyd resin. When the top coat or layer has been constituted as described using vehicles of the oleoresinous and similar types, seal coat compositions have been developed which are usually of the oleoresinous type and which are suitable for the purpose in that they provide a barrier that is effective in preventing bleeding of the bitumen comprised in the felt base sheet into the top coating or layer and likewise provide suitable adhesion both to the impregnated felt base sheet and to the top coat or layer.

As compared with the employment of compositions comprising vehicles of the oleoresinous, alkyl or similar types, vinyl resins have known properties of increased resistance to abrasion and increased resistance to chemicals which render them of especial value and utility in providing the wear-resistance and decorative layer or coating for a felt base floor covering. However, utilization of vinyl resins for providing a decorative and wear-resistant surface layer for a felt base floor covering has given rise to special problems as regards the provision of suitable seal coat means, for without suitable seal coat means a surface layer or coating of the vinyl composition type is very susceptible to staining and discoloration due to migration of bitumen from the impregnated felt base sheet. Vinyl compositions have known properties of lack of adhesion to conventional paints, varnishes, lacquers and the like and it is because of this lack of adhesion that an outer coating of vinyl resin composition cannot satisfactorily be applied to conventional seal coat compositions having an oleoresinous or nitrocellulose base.

When the vinyl composition is of the fused type that is initially applied as an organosol, a plastisol, or a hydrosol and after drying is fused by subjecting it to a temperature of the order of 350° F., such difficulties have been experienced with the asphalt bleeding out of the felt that it has generally been accepted that the asphalt-impregnated felt that is used as the base for floor and wall coverings is of such character as not to be able to withstand the fusion temperatures that are encountered in the fusing of a vinyl composition coat or layer. The fusing of a vinyl composition coat or layer likewise renders more difficult the problem of affording an effective barrier or seal coat, for the heat required for effective fusing exercises a softening effect both on the asphalt with which the felt is impregnated and on the vehicle used in the seal coat or coats, thereby tending to promote migration of the asphalt into the seal coat from which further migration into the top coat or layer may occur either at the time or gradually over a substantial period of time. Whenever such bleeding into and staining of the top coat or layer may occur, the covering becomes without substantial practical value. Vulnerability to failure because of delamination in service likewise is such as to render the covering without substantial practical value.

One of the methods which has been used in seeking to overcome the difficulties due to poor adhesion of a vinyl composition coating to a seal coat and due to lack of capacity of the impregnated felt to resist the temperatures employed in fusing a vinyl composition coating has consisted in applying a desired design to a high quality grade of rubber-impregnated paper as by printing, applying and fusing a clear vinyl wear layer, and thereafter laminating the resulting sheet to a sheet of asphalt-impregnated felt by means of an adhesive. However, the high cost of the rubber-impregnated paper, the delamination difficulties and the shrinkage failures of the adhesive bond which occur on aging or in service have been such that this method has generally been regarded as unacceptable.

It is an object of this invention to provide a flexible felt base covering having a vinyl composition top coating or layer wherein the aforesaid difficulties are overcome by the provision of a combination which successfully attains at the same time both the prevention of bleeding or staining and permanent and good adhesion at each interface between the coatings or layers comprised in the covering. It is a further object of this invention to provide an adherently combined bitumen-impregnated felt base sheet and a vinyl composition coating or layer which will successfully withstand fusion temperatures of the order of 350° F. employed in producing a vinyl composition coating or layer of the fused type.

We have found that excellence both as regards the effectiveness of the barrier seal and as regards adhesion can be afforded by employing an oleoresinous seal coat applied to the felt base sheet provided the proportion of the oleoresinous vehicle in the seal coat is within certain critical limits in relation to the oil absorption value of the filler content of the seal coat, and provided there is interposed between the top coat or layer of vinyl composition and the seal coat two primer coats or layers whose composition and critical formulation for obtaining the aforesaid objects and improvements are described hereinbelow. We also have found that if the bitumen with which the felt is impregnated does not exceed a critical percentage of the kerosene value of the felt the combination of the felt with a vinyl composition top coating or layer is such that the fusion temperatures of the order of 350° F. that ordinarily are required for producing a fused coating or layer of vinyl composition may be employed without adverse effect either upon the felt base sheet or upon any other part of the covering as a whole.

A preferred embodiment of this invention is illustrated in the accompanying drawing which is a sectional view of a covering of the character described in which 1 is a bitumen-impregnated felt base sheet, 2 is a seal coat for preventing migration of bitumen therein or therethrough from the base sheet, 3 and 4 are first and second primer coats, 5 is a decorative coat, and 6 is a clear wear-resistant coat, the coatings 5 and 6 providing a composite decorative and wear-resistant coating or layer. The formulation and characteristics of the different coats or layers and their correlation in combination whereby the aforesaid objectives and improvements have been realized will now be described.

The seal coat 2 is of the oleoresinous type and as regards the ingredients thereof, namely, the oleoresinous vehicle and the filler, they are conventional. However, for effective employment according to this invention it is critical that the relative proportions thereof be such that the oleoresinous vehicle constitutes from about 50% to about 135% of the oil absorption value of the filler. The oleoresinous vehicle may contain any of the drying oils and compatible resins conventionally employed for the purpose of providing a binder which is liquid or semi-liquid as applied and which is adapted after application to dry to a hard, tough consistency. For example, the drying oil may be an oil such as linseed oil or soya bean oil and the resin may be one of the commonly used compatible resins such as rosin or ester gum. Any inert filler may be used and those fillers may be used which have conventionally been employed in paints adapted for use as a seal coat when applied to a bitumen-impregnated felt. While whiting is a preferred filler, other fillers may be employed such as clay, wood flour, slate flour, ground limestone, pigments, and the like. While the particular oleoresinous vehicle or filler that is employed is not critical to the formulation of the seal coat, it is critical, as aforesaid, that the amount of the binder vehicle fall with a given range in relation to the filler component. However, the binder requirements in this regard vary depending on different surface characteristics of different fillers and we have found that the proportional requirements for the oleoresinous binder vehicle in relation to the filler depends on the aforesaid limits of percentage of the oil absorption value of the filler, the resultant calculated percentage being the number of parts by weight of binder vehicle per 100 parts by weight of filler. The oil absorption value of the filler is defined as the number of pounds of oil required to exactly "wet" 100 pounds of filler as tested by the spatula "rub-out" method for oil absorption given in A. S. T. M. method D28–31. The preferred binder content of the oleoresinous seal coat paint film is 113% of the oil absorption value of the filler. Accordingly the preferred formulation when using the above-mentioned filler having an oil absorption value of 15 consists of substantially 16.9 parts by weight of oleoresinous binder vehicle per 100 parts by weight of filler. The employment of the binder vehicle so as to be from 50% to 135% of the oil absorption value of the filler is important in overcoming difficulties such as poor adhesion and excessive porosity of the film.

The seal coat is preferably applied in the form of an aqueous oil-in-water emulsion which can be prepared in any suitable way as by dispersing the filler and the binder in water with the aid of a colloid mill and using a protective colloid such as casein. The emulsion may be applied using any conventional coating equipment such as a roll coater or using a doctor. After application the seal coat is dried, preferably at elevated temperature, to provide a continuous film effective as a seal or barrier. While it is preferable to apply the seal coat in the form of an aqueous emulsion, it also may be applied as a solution. In either case the seal coat composition is to be regarded as coming within the term "paint" as this term is used herein and in the claims.

The first primer coat, which is indicated by the numeral 3 in the accompanying drawing, is characterized by binder material consisting essentially of butadiene-acrylonitrile copolymer rubber and vinyl polymer resin selected from the group consisting of polymerized vinyl chloride, polymerized vinylidene chloride and copolymers thereof in the relative proportions by dry weight of about 20 to about 70 parts by dry weight of the butadiene-acrylonitrile rubber and about 80 to about 30 parts by weight of the vinyl polymer resin, any filler contained in the first primer coat being less than about 80% by dry weight thereof.

The material referred to above as butadiene-acrylonitrile copolymer rubber is a rubbery resinous material obtained by copolymerization of butadiene and acrylonitrile, and in which the butadiene predominates. Such rubbery copolymers are typified by the copolymer containing about 67% by weight of butadiene and about 33% by weight of acrylonitrile and which is sold in the form of an aqueous emulsion under the trade-name Hycar OR–25 by the B. F. Goodrich Chemical Company of Cleveland, Ohio.

The vinyl polymer resin component of the first primer coat may consist of polymerized vinyl chloride, polymerized vinylidene chloride, mixtures of these two materials with each other, or copolymer mixtures of one or both of these materials with a maximum of 20% of other monomers copolymerizable therewith in aqueous emulsion such as vinyl acetate, vinyl propionate, vinyl butyrate, methyl acrylate, vinyl methacrylate, ethyl methacrylate, maleic acid, chloromaleic acid and other similar materials. Because of its tough characteristics vinylidene polymers and copolymers are usually preferred.

The binder vehicle of the first primer coat consists essentially entirely of the butadiene-acrylonitrile copolymer rubber and the vinyl polymer resin as the sole ingredients thereof. If desired, filler material such as any of those above exemplified may be employed in the first primer coat. The first primer coat is effective for its purpose without any filler. However, filler may be used as a diluent because of its relatively low cost as compared with the binder vehicle, but if filler is employed the amount should be held down so as to be less than about 80% by weight of the first primer coat. It is important in the practice of this invention that the first primer coat consist essentially of the aforesaid binder ingredients either with or without filler. A typical example of preferred formulation for the first primer coat is as follows:

*Example.—First primer coat*

| | Parts by weight |
|---|---|
| Copolymer of butadiene and acrylonitrile containing 33 parts acrylonitrile | 25 |
| Vinylidene copolymer | 50 |
| Whiting | 225 |

Another typical example of preferred formulation for the first primer coat is:

| | Parts by weight |
|---|---|
| Copolymer of butadiene and acrylonitrile containing 33 parts acrylonitrile | 20 |
| Copolymer of vinyl chloride and methyl methacrylate | 30 |
| Whiting | 50 |

The first primer is preferably applied in the form of an aqueous dispersion. Both the butadiene-acrylonitrile copolymer rubber and the vinyl polymer resin are commercially available in the form of aqueous lattices containing about 50% solids. The preparation of the aqueous dispersion for application of the first primer coat follows conventional practice familiar to those versed in the art. Thus, when a filler is employed it may be dispersed in water using the usual wetting, sequestering and anti-foaming agents, and alkali. The alkali provides a pH of 7 or above so that there will be no tendency to coagulate the latices. Wetting agents of the sodium alkyl sulfate type or alkyl aryl polyether alcohol type such as those sold under the trade names of Tergitol #7 made by Carbide and Carbon Chemicals Co. of New York, New York or Igepal CA made by General Dyestuff Corporation, New York, New York are suitable. Examples of suitable anti-foaming agents are pine oil and silicone anti-foaming agents. A suitable protective colloid and sequestering agent is tetrasodium pyrophosphate. The filler slurry preferably is ground so that the filler may be produced in a highly dispersed state; and the filler dispersion is mixed with the latices to produce the aqueous dispersion that is applied in producing the first primer coat. The first primer coat may be applied in any desired way, the use of a flexible doctor blade coating machine having been found especially desirable. The first primer coat may be applied as, for example, at the rate of about 0.25 to 0.5 lb. (dry weight) per square yard and dried, and if desired, the drying can be accelerated so that it may be accomplished in only a few minutes by carrying it out at an elevated temperature.

Normally it is considerably more advantageous to apply the solid ingredients of the first primer coat in the form of an aqueous emulsion. However, the solid ingredients could be effectively applied in the form of a solution using, for example, a solvent of the toluol or methyl ethyl ketone type. However, the amount of solvent dilution required and the cost of using the solvent and removing it from the initially applied coating is such as to render solution applications relatively impractical under normal operating conditions.

The second primer coat, which is indicated by the numeral 4 in the accompanying drawing, is formulated using the ingredients employed in the first primer coat as further combined with a plasticizer for the vinyl polymer resin. Thus the second primer coat is characterized by consisting essentially of butadiene-acrylonitrile copolymer rubber, vinyl polymer resin selected from the group consisting of polymerized vinyl chloride, polymerized vinylidene chloride and copolymers thereof and plasticizer for the vinyl polymer resin, the butadiene-acrylonitrile copolymer rubber and the vinyl polymer resin being present in the relative proportions in parts by weight of about 20 to about 70 parts of the former and about 80 to about 30 parts of the latter, there being about 5 to about 300 parts of the plasticizer per 100 parts of the vinyl polymer resin, and any filler that is present being less than about 80% by weight of the second primer coat.

The nature of the butadiene-acrylonitrile rubber and of the vinyl polymer resin that are employed in the second primer coat is as stated above in connection with the description of the first primer coat. The plasticizer component of the second primer coat may be any of those known in the art for functioning as a plasticizer with the described vinyl polymer resins. Examples of such plasticizers are tricresyl phosphate, dibutyl phthalate, dioctyl phthalate, butyl phthalyl, butyl glycollate, dioctyl sebacate, ethylene glycol dioleate and octyl o-benzoyl-benzoate.

The following is a typical example of preferred formulation of the second primer coat:

*Example.—Second primer coat*

| | Parts by weight |
|---|---|
| Copolymer of butadiene and acrylonitrile containing 35 parts acrylonitrile | 22 |
| A blend containing 75 parts by weight of polyvinyl chloride and 25 parts by weight of dioctyl phthalate | 28 |
| Titanium dioxide | 25 |
| Whiting | 100 |

The preparation and application of the second primer coat corresponds to the foregoing description in connection with the first primer coat including application in the form of either an aqueous dispersion or solution. When the coating is applied in the form of an aqueous dispersion according to preferred practice, the latex of vinyl polymer resin may contain the plasticizer whereas in the case of the first primer coat the latex of vinyl polymer resin does not contain plasticizer.

For the base sheet, any suitable felt may be employed. The felt generally is produced by felting fibers using a Fourdrinier or cylinder paper machine so that the thickness of the resulting felt is that usual for use in floor and wall coverings, i. e., about .02 to about .08 inch, a thickness of about .055 inch usually being preferable for most purposes. The usual fibers used in felts for floor and wall coverings may be employed such as wood fibers, rag fibers and the like, although other fibers may be used including fibers of mineral and animal origin. The usual furnish for the felt used as the base sheet for floor and wall coverings contains from about 27% to about 60% rag fiber, from about 35% to about 55% wood fiber, from zero to about 20% paper stock and from zero to about 10% wood flour.

We have found that a vinyl composition coat or layer of fused type may be successfully applied in adherent relation to the felt base and fused as so applied by subjecting it to a temperature of the order of 350° F. without undue bleeding of the bitumen or other injury to the felt or to the covering if the amount of bitumen is controlled so as to be lower than that which is conventional in the case of the base sheet for floor and wall coverings. Because the amount of bitumen that may be used varies with different compositions, i. e., depending on the "furnish" of the felt, the limit of impregnation of the felt is more accurately expressed in terms of percentage of the "kerosene value" of the felt; the "kerosene value" of the felt, as this term is used herein and in the claims, being the maximum amount of kerosene that can be absorbed by a bone dry sample of a particular felt according to the test as prescribed in Underwriter's Laboratories, Inc., Standard for Class "C" Asphalt Rag-Felt Sheet Roofing and Shingles specification, Ninth Edition, November 1946. When the vinyl composition is of the fused type, we have found that the maximum amount of bitumen used to impregnate the felt should not exceed about 85% of the kerosene value, and usually according to preferred practice, the amount of bitumen employed is of the order of 65% plus or minus 5 of the kerosene value of the felt. Such amounts of bitumen run low in comparison with the amounts used in felts for floor and wall coverings, which latter amounts usually correspond with or are more than the kerosene value of the felt.

Any bituminous material that is conventional for impregnating felt used for floor and wall coverings may be employed in the practice of this invention. Usually the asphalts are of either petroleum or natural origin or blends of both; and they may be crude, blown or steam distilled. In addition, other bitumens may be used such as tar or pitch residues of vegetable and animal origin. Generally the bitumen most suitable for impregnating the felt base sheet will have a melting point of about 140° F. to about 150° F.; a penetration of about 8 to about 12 at 32° F.; a penetration of about 22 to about 27 at 77° F.; a penetration of about 95 to about 100 at 115° F.; and a ductility of not less than 20 at 77° F. when heated according to A. S. T. M. methods E28–51T, D5–49, and D113–44. As affording a typical example of the practice of the invention, a felt sheet about .055 inch in thickness consisting of 40% rag fiber, 40% wood fiber, 17% paper stock and 3% wood flour, has a kerosene value of the order of 185% plus or minus 7%; and an asphalt having the aforesaid constants is used to impregnate the felt to the extent of 60% plus or minus 5 of kerosene value of the felt.

The felt base sheet having had the seal coat and the two primer coats applied thereto as hereinabove described may have any type of vinyl composition applied thereto in any appropriate form depending on such factors as the decorative effect desired and the wear resistance desired. However, it is one of the advantages of this invention that the above-described combination of base sheet, seal coat and first and second primer coats is of such effectiveness in obtaining good adhesion as well as sealing that it has been found to be capable of successful use even when a clear vinyl composition layer is applied over a decoration applied to the second seal coat by a rotary graphic art printing process. Such a clear vinyl composition film is especially difficult to make firmly adherent. Moreover, such films are usually intended to provide wear resistance and the normal thickness for providing the desired wear resistance is of the order of 0.004 inch to 0.006 inch. When such a coating is fused by heating it to a temperature in the neighborhood of 350° F., the bitumen-impregnated felt base sheet, if conventional, is so affected as to render the covering unsalable; but when the felt base sheet is impregnated to the controlled limited extent above described there is no injurious effect on the felt when the wear resisting layer is fused.

When the desired decoration is applied in the form of an ink followed by a clear layer or film of vinyl composition, the ink may be applied in any way appropriate for producing the particular decoration desired. The techniques usually employed in connection with rotogravure, letter press, aniline, or lithographic processes are suitable. Suitable vinyl base inks for use in such operations are known and usually consist of plasticized vinyl resin, pigment of suitable color and a solvent which usually is of the methyl ethyl ketone type. Some such inks contain an extender resin such as nitrocellulose, particularly if vinyl butyrate is employed. Other examples of vinyl resins and plasticizers have been mentioned hereinabove.

The clear wear resisting layer or film usually consists of a mixture consisting essentially of vinyl polymer resin and plasticizers such as those above mentioned in connection with the second primer coat, without filler, pigment or other ingredient. Usually there are in the neighborhood of 30 parts by weight of plasticizer per 100 parts of vinyl polymer resin. When the clear layer is of the fused type it may be applied as an organosol, plastisol or hydrosol using conventional coating equipment. The coating thereafter is dried to remove volatile material and is fused by subjecting it, as by exposure to infra-red radiation, to a temperature at which the plasticized vinyl resin particles become fused, which is usually in the neighborhood of 350° F. although somewhat higher or lower temperatures may be employed depending on whether the vinyl polymer resin has a relatively low or relatively high softening point.

Instead of providing a composite decorative and wear resistant coating, there may be applied to the second primer coat as by block printing a vinyl print paint comprising a vinyl resin, a plasticizer and some suitable pigment, filler or the like in the form of an organosol, plastisol or hydrosol followed by drying and fusing.

While it normally is preferable that the decorative and wear resistant layer be of the fused type, either the clear wear-resistant coating that is applied over the applied ink decoration or the pigmented print paint may be of the type wherein the plasticized vinyl resin is dissolved in a suitable solvent vehicle. Moreover, particularly if a heavier coating layer is desired, a preformed film of vinyl composition may be applied using a suitable vinyl adhesive for uniting it with the second primer. When the vinyl composition decorative and wear-resistant coating or layer is thus applied without fusing, then it is not essential that the impregnated felt base sheet contain bitumen in the limited controlled amount hereinabove described.

More generally the decorative and wear-resistant coating or layer may be unitary or composite, and while the binder component thereof may contain substances other than plasticized vinyl polymer resin the plasticized vinyl resin constitutes at least a major proportion of the binder component and thereby characterizes the composition as a vinyl composition, as this term is used herein and in the claims. Any vinyl polymer resin may be used which, either alone or in combination with a plasticizer, provides the desired toughness and hardness for the covering. Of course, the vinyl composition coating may be applied so as to provide either a uniform color effect or a variegated or pattern effect as may be desired.

By the employment of the above described combination we have found that excellent properties both as regards resistance to bleeding and resistance to delamination are afforded. We likewise have found that both the formulation requirements of the individual coats or layers and the interrelation of the coats or layers as hereinabove described are of critical importance. Thus the relative proportion of the oleoresinous binder and filler in the seal coat is essential in order to obtain satisfactory results as regards barrier effectiveness, adhesion to the first primer coat and proper strength. As regards the first primer coat, attempts to omit either of the binders or to replace either with some other binder material ingredient resulted in defective adhesion to the seal coat. There also was defective adherence of the first primer coat to the seal coat when a plasticizer was present in the first primer coat except in an amount so small as to be taken up by the filler leaving the binder vehicle essentially unaffected by the plasticizer. Similar considerations apply to the second primer coat, except in this case omission of the plasticizer resulted in poor adhesion with the top coating or layer of vinyl composition. Whether the first or second primer coats are applied from aqueous suspension or a solution, it is not necessary that either be fused. However, if the top coat or layer or any part thereof is fused, the fusion temperature affects the primer coats, particularly the second primer coat. Moreover, if any of the coats or layers are fused then the aforesaid proportion of the bitumen impregnant for the base sheet is critical.

We claim:

1. A flexible hard surface covering which comprises a bitumen-impregnated felt base sheet, a vinyl composition top layer and in combination for bonding said top layer to said base sheet and for providing a seal therebetween a seal coat of paint consisting essentially of oleoresinous binder material and filler applied to and formed on said base sheet, the said binder material being comprised in said seal paint so as to constitute from about 50% to about 135% of the oil absorption value of said filler; a first primer coat applied to and formed on said seal coat and characterized by binder material consisting essentially of butadiene-acrylonitrile copolymer rubber and vinyl polymer resin selected from the group consisting of polymerized vinyl chloride, polymerized vinylidene chloride and copolymers thereof in the relative proportion by dry weight of about 20 to about 70 parts by weight of said butadiene-acrylonitrile copolymer rubber and about 80 to about 30 parts of said vinyl polymer resin, any filler contained in said first primer coat being less than about 80% by weight of said coat; and a second primer coat applied to and formed on said first primer coat and characterized by binder consisting essentially of butadiene-acrylonitrile copolymer rubber, vinyl polymer resin selected from the group consisting of polymerized vinyl chloride, polymerized vinylidene chloride and copolymers thereof and plasticizer for said vinyl polymer resin, said butadiene-acrylonitrile rubber and vinyl polymer being present in the relative proportions in parts by weight of about 20 to about 70 parts of the former and about 80 to about 30 parts of the latter, there being about 5 to about 300 parts by weight of plasticizer per 100 parts by weight of vinyl resin and any filler contained in said second primer coating being less than about 80% by weight of said second primer coat; said vinyl composition top layer being applied to and formed on said second primer coat.

2. A flexible hard surface covering which comprises in combination a felt base sheet impregnated with bitumen constituting not more than about 85% of the kerosene value of the felt; a seal coat of paint consisting essentially of oleoresinous binder material and filler applied to and formed on said base sheet, the said binder material being comprised in said seal paint so as to constitute from about 50% to about 135% of the oil absorption value of said filler; a first primer coat applied to and formed on said seal coat and characterized by binder material consisting essentially of butadiene-acrylonitrile copolymer rubber and vinyl polymer resin selected from the group consisting of polymerized vinyl chloride, polymerized vinylidene chloride and copolymers therewith in the relative proportions by dry weight of about 20 to about 70 parts by weight of said butadiene-acrylonitrile rubber to about 80 to about 30 parts by weight of said vinyl polymer resin, any filler contained in said first primer coat being less than about 80% by weight of said coat; a second primer coat applied to and formed on said first primer coat and characterized by binder consisting essentially of butadiene-acrylonitrile copolymer rubber, vinyl polymer resin selected from the group consisting of polymerized vinyl chloride, polymerized vinylidene chloride and copolymers therewith and plasticizer for said vinyl polymer resin, said butadiene-acrylonitrile rubber and vinyl polymer resin being present in the relative proportions in parts by weight of about 20 to about 70 parts of the former to about 80 to about 30 parts of the latter, there being about 5 to about 300 parts by weight of plasticizer per 100 parts by weight of vinyl resin and any filler contained in said second primer coat being less than about 80% by weight of said second primer coat; and a fused layer of vinyl composition applied to and formed on said second primer coat.

3. A flexible hard surface rug according to claim 2 wherein the fused layer of vinyl composition is a composite layer comprising a colored decoration and an overlying substantially clear wear-resistant protective layer.

4. A flexible hard surface covering, according to claim 2, wherein the bitumen constitutes about 60% to about 70% of the kerosene value of the felt.

5. A flexible hard surface covering which comprises in combination a felt base sheet impregenated with bitumen constituting from about 60% to about 70% of the kerosene value of the felt; a seal coat of paint consisting essentially of oleoresinous binder material and filler applied to and formed on said base sheet, the said binder material being comprised in said seal paint so as to constitute from about 50% to about 135% of the oil absorption value of said filler; a first primer coat applied to and formed on said seal coat and characterized by binder material consisting essentially of butadiene-acrylonitrile copolymer rubber containing about 67% butadiene and about 33% acrylonitrile and polymerized vinylidene chloride in the relative proportions by dry weight of about 20 to about 70 parts by weight of said butadiene-acrylonitrile rubber to about 80 to about 30 parts by weight of said polymerized vinylidene chloride, any filler contained in said first primer coat being less than about 80% by weight of said coat; a second primer coat applied to and formed on said first primer coat and characterized by binder consisting essentially of butadiene-acrylonitrile copolymer rubber containing about 67% butadiene and 33% acrylonitrile, polymerized vinyl chloride and a plasticizer therefor, said butadiene-acrylonitrile rubber and polymerized vinyl chloride being present in the relative proportions in parts by weight of about 20 to about 70 parts of the former to about 80 to about 30 parts of the latter, there being about 5 to about 300 parts by weight of plasticizer per 100 parts by weight of vinyl resin and any filler contained in said second primer coat being less than about 80% by weight of said second primer coat; and a fused layer of vinyl composition applied to said second primer coat.

6. A flexible hard surface covering which comprises in combination a felt base sheet impregnated with bitumen constituting from about 60% to about 70% of the kerosene value of the felt; a seal coat of paint consisting essentially of oleoresinous binder material and filler applied to and formed on said base sheet, the said binder material being comprised in said seal paint so as to constitute from about 50% to about 135% of the oil absorption value of said filler; a first primer coat applied to and formed on said seal coat and characterized by binder material consisting essentially of butadiene-acrylonitrile copolymer rubber containing about 67% butadiene and about 33% acrylonitrile and a copolymer of vinyl chloride and methyl methacrylate in the relative proportions by dry weight of about 20 to about 70 parts by weight of said butadiene-acrylonitrile rubber to about 80 to about 30 parts by weight of said copolymer of vinyl chloride and methyl methacrylate, any filler contained in said first primer coat being less than about 80% by weight of said coat; a second primer coat applied to and formed on said first primer coat and characterized by binder consisting essentially of butadiene-acrylonitrile copolymer rubber containing about 67% butadiene and 33% acrylonitrile, polymerized vinyl chloride and a plasticizer therefor, said butadiene-acrylonitrile rubber and polymerized vinyl chloride being present in the relative proportions in parts by weight of about 20 to about 70 parts of the former to about 80 to about 30 parts of the latter, there being about 5 to about 300 parts by weight of plasticizer per 100 parts by weight of vinyl resin and any filler contained in said second primer coat being less than about 80% by weight of said second primer coat; and a fused layer of vinyl composition applied to said second primer coat.

7. A process of preparing a flexible hard surface covering which comprises impregnating a felt base sheet with bitumen in an amount no more than 85% of the kerosene value of the felt, applying a seal coat comprising oleoresinous binder material and filler, said binder material constituting from about 50% to about 135% of the oil absorption value of said filler, applying to and forming on said seal coat a first primer coat comprising binder material consisting essentially of butadiene-acrylonitrile copolymer rubber and vinyl polymer resin selected from the group consisting of polymerized vinyl chloride, polymerized vinylidene chloride and copolymers therewith in the relative proportions by dry weight of about 20 to about 70 parts by weight of said butadiene-acrylonitrile rubber to about 80 to about 30 parts by weight of said vinyl polymer resin, applying to and forming on said first primer coat a second primer coat comprising binder material consisting essentially of butadiene-acrylonitrile copolymer rubber, vinyl polymer resin selected from the group consisting of polymerized vinyl chloride, polymerized vinylidene chloride and copolymers therewith and plasticizer for said vinyl polymer resin, said butadiene-acrylonitrile rubber and vinyl polymer resin being present in the relative proportions in parts by weight of about 20 to about 70 parts of the former to about 80 to about 30 parts of the latter, there being about 5 to about 300 parts by weight of plasticizer per 100 parts by weight of vinyl resin and applying to and forming on said second primer coat a fused layer of vinyl composition.

8. A process according to claim 7 wherein said first and second primer coats contain filler material in an amount not to exceed about 80% by weight of said coats.

9. A process according to claim 7 wherein said felt base sheet is impregnated with bitumen in an amount from about 60% to about 70% of the kerosene value of the felt.

References Cited in the file of this patent

UNITED STATES PATENTS

| | | |
|---|---|---|
| 2,133,886 | Beegle et al. | Oct. 18, 1938 |
| 2,618,580 | Lancaster | Nov. 18, 1952 |
| 2,624,682 | Hazeltine | Jan. 6, 1953 |
| 2,624,683 | Bezman | Jan. 6, 1953 |
| 2,705,683 | Hazeltine et al. | Apr. 5, 1955 |
| 2,705,684 | Hazeltine et al. | Apr. 5, 1955 |
| 2,707,157 | Stanton et al. | Apr. 26, 1955 |